United States Patent [19]
Giannotti

[11] Patent Number: 4,852,815
[45] Date of Patent: Aug. 1, 1989

[54] TRANSIT REFUSE RESOURCE RECOVERY AND INCINERATION SYSTEM

[76] Inventor: Hugo V. Giannotti, 879 S. Country Rd., E. Patchogue, N.Y. 11772

[21] Appl. No.: 166,450

[22] Filed: Feb. 29, 1988

[51] Int. Cl.⁴ .............................................. B02C 21/02
[52] U.S. Cl. ...................................... 241/65; 110/240; 241/79.1; 241/101.7
[58] Field of Search ................ 110/240, 244, 346; 241/101.2, 101.7, 79.1, 81, 65

[56] References Cited
U.S. PATENT DOCUMENTS

| | | | |
|---|---|---|---|
| 2,862,462 | 12/1958 | Brandt et al. | 110/240 X |
| 2,961,977 | 11/1960 | Coleman | 110/240 X |
| 3,682,117 | 8/1972 | Rousseau | 110/240 X |
| 3,939,783 | 2/1976 | DuChambon | 110/240 |
| 4,623,515 | 11/1986 | Frei et al. | 241/DIG. 38 X |

Primary Examiner—Mark Rosenbaum

[57] ABSTRACT

In transit refuse recovery and incineration system for processing refuse as it is collected including bag-ripping, sorting, shredding, pre-heating and pre-volatilization, classifying, incineration, gas clean-up, and bins for re-cyclable items and ash. Pre-heating and pre-volatilization, in conjunction with air classifying prior to incineration, leads to low air-flow usage, compactness and mobility, dioxin reduction, and high gas clean-up efficiency.

8 Claims, 2 Drawing Sheets

TRANSIT REFUSE RESOURCE RECOVERY AND INCINERATION SYSTEM

The need for improved refuse disposal systems has become increasingly evident. Air and water pollution control requirements, labor cost, equipment costs, incineration costs, tipping costs, concerns regarding proximity to residential areas—all point up the need for sweeping and perhaps radical improvements in the refuse disposal field.

The conventional disposal means of landfills, central incineration, and re-cycling all have major drawbacks. Landfill space is becoming increasingly scarce and remotely located from populated areas; central incineration is expensive with siting and obtaining community approval becoming increasingly difficult, and downtime of the incinerator requires by-pass of the refuse to landfills or other incinerators; effective re-cycling is not only costly, since markets for the separated materials are limited, but becoming extremely difficult to obtain total compliance by the public.

This invention relates to a specific approach for resolving many of these problems and contemplates replacing rubbish and refuse pickup trucks with an in-transit mobile, sorting, resource recovery and incineration system (ITRI), and doing this continuously as the vehicle collects the refuse. The system approach includes removal of fines, flail mill for size reduction, a pre-heating and volatilization unit, separation of combustibles, combustion chamber, final cyclonic clean-up and dilution.

As the vehicle moves from house to house the refuse is picked up without any preliminary sorting by the homeowner. Of course any preliminary sorting would ease the burden on the equipment and increase its operating life. In any event 100% pre-sorting compliance is not required. The vehicle sorts, separates, incinerates and cleans the exhaust gases as it travels down the road from house to house. It does not store refuse and consequently the time ordinarily used in transporting to a central incinerator or landfill is efficiently used in processing the refuse. By combining these operations the labor required for the pick up and processing is the minimum possible per ton of refuse.

The advantages of the ITRI approach can be summarized as follows:

1. Most economical system to the consumer.
2. Overall level of residual effluent pollutants substantially reduced because of normal dispersion by vehicle over a very large area. Clean exhaust is equitably distributed. Location is not fixed to a particular "back yard."
3. No additional effort required on part of consumer.
4. No by-pass problems as a result of down-time. Vehicle servicing can be staggered without affecting operation of entire system.
5. Initial capital cost of first unit extremely low compared to central incineration.
6. No tall stack intrusion on aircraft airspace.

It is an object of the invention to provide a system for processing refuse which will sort, size reduce, pre-heat, separate combustibles, incinerate combustibles, and remove particulate matter from the combustion products, and do so in transit, as the refuse is collected, in a vehicular trailer arrangement.

Other objects and advantages will become apparent from the following description taken in connection with the accompanying drawings in which.

Figure 1:
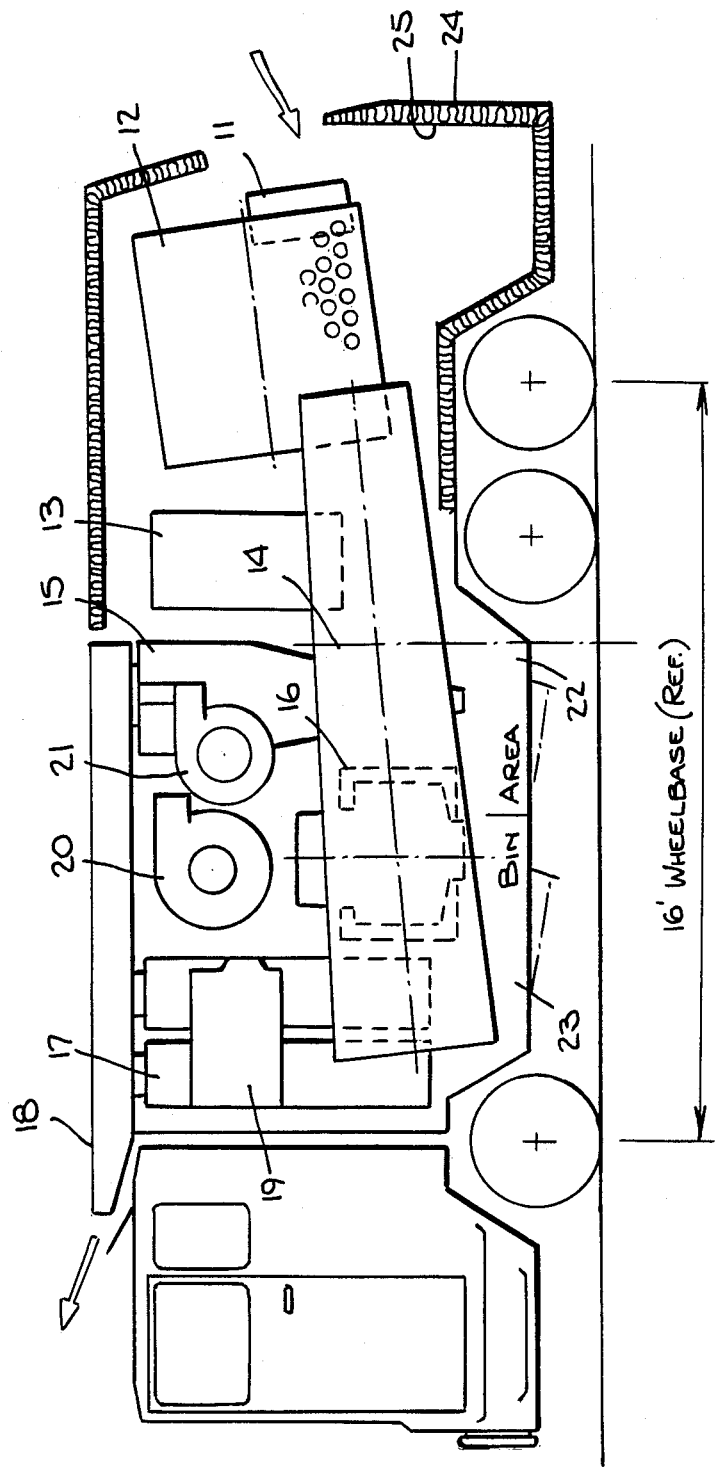
FIG. 1 is a diagrammatic view of the novel in-transit refuse resource recovery and incineration system.

Referring to FIG. 1 the refuse is placed into a hopper 11 which contains a bag ripping unit located essentially at the mouth of trommel 12. The rotating screen trommel is inclined to the horizontal and the refuse entering the trommel is continuously shifted within the trommel, dropping out fines. Trap doors in the trommel are used to reject high density items such as large steel parts. The oversize from the trommel reports to the shredder flail mill 13 which substantially reduces the refuse size. The undersize, which will contain most of the glass and much of the aluminum and ferrous metal, reports to the resource recovery bin 22.

The shredder material reports to the classifier/prevolatilization unit 14 which is a slowly revolving tapered drum approximately $3\frac{1}{2}$ feet in diameter at the air inlet and $2\frac{1}{2}$ feet in diameter at the material feed end, the main purpose of which is to act as a pre-heat and partial volatilization unit using the exhaust gas from the combustion chamber 16. The classifier/volatilizer unit 14 also classifies the material into approximately 80% lights which report to the classifier cyclone 15 and 20% heavies which report to the resource recovery bin 22. The material entering the classifier cyclone 15 consists of the light combustible fraction and transport gases. The combustible fraction is separated and reports to the combustion chamber 16 while the gases report to the exhaust-dilution system and discharge duct 18.

The material from the classifier cyclone 15 enters the high-intensity combustion chamber 16 and is burned. Part of the hot gas generated is directed to the classifier/volatilizer 14 for the pre-heating function and the remainder is directed to the main cyclone 17 after being partially cooled by mixing with outside dilution air introduced into the connecting ductwork. Separated ash reports to the ash bin 23 and the cooled and clean gas effluent is directed to the discharge duct 18. In order to alleviate the noise generated by the equipment the inside of the outer casing 24 is lined with sound absorbing material 25.

Figure 2:
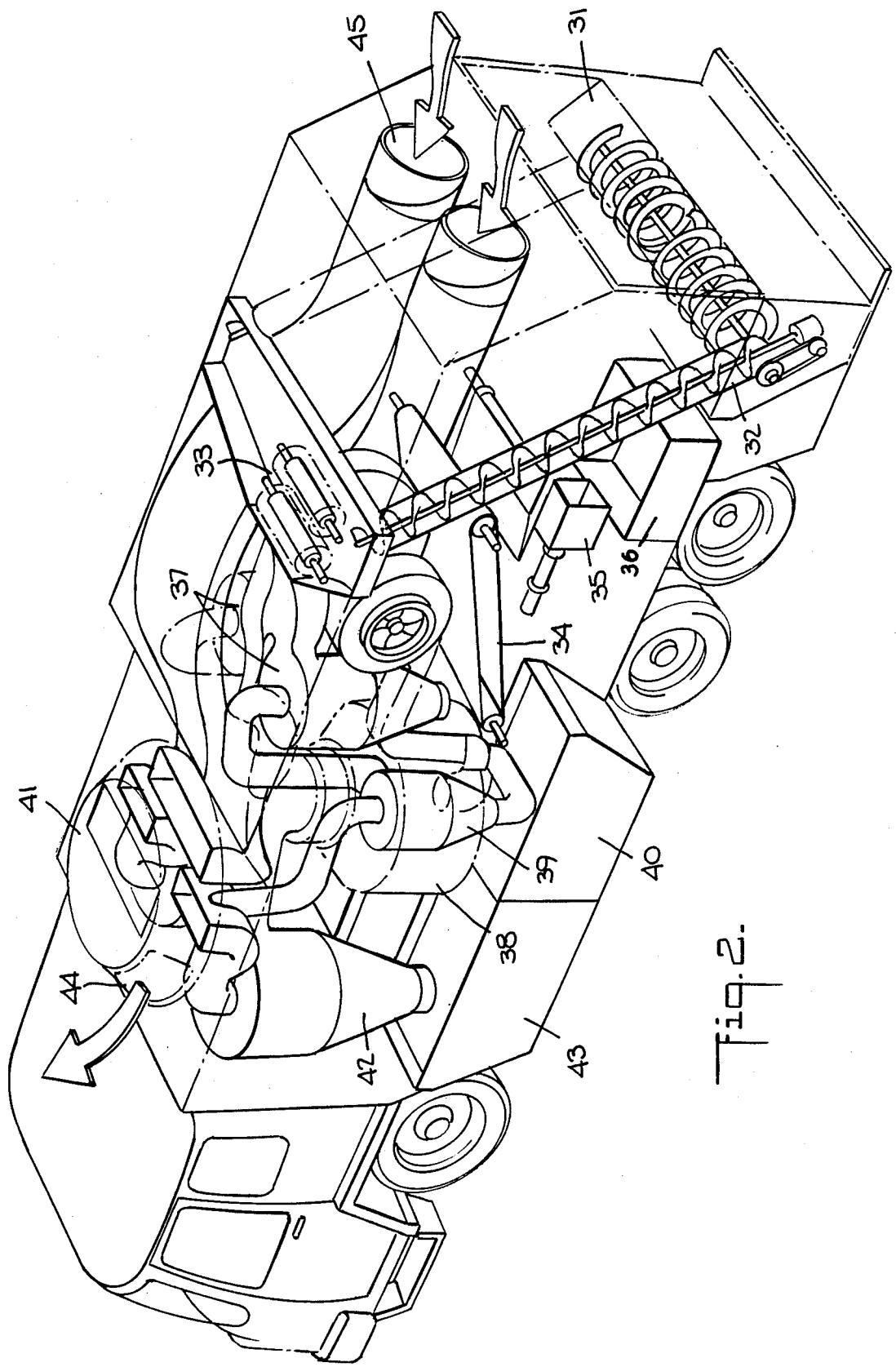
FIG. 2 is a pictorial view of the novel system in a modified arrangement.

Referring to FIG. 2 the refuse is placed into a hopper 31 which contains a bag ripping unit. After preliminary loosening and light shredding the refuse by means of a screw conveyor 32 reports to the shredder flail mill 33 which substantially reduces the refuse size. The refuse then reports to the magnetic separator 34 separating out the ferrous material which reports to the compactor 35 and then to the ferrous recovery bin 36. The remainder of the refuse reports to the classifier/volatilizer 37 which acts as a pre-heat and partial volatilization unit using exhaust gas from the combustion chamber 38 and also classifies the material into approximately 80% lights, which report to the classifier cyclone 39, and 20% heavies, which report to the solid residue resource recovery bin 40. The material entering the classifier cyclone 39 consists of the light combustible fraction and transport gases. The combustible fraction is separated and reports to the combustion chamber 38 while the gases report to the exhaust dilution chamber 41.

The material from the classifier cyclone 39 enters the high-intensity combustion chamber 38 and is burned. Part of the hot gas generated is directed to the classifier/volatilizer 37 for the pre-heating function and the remainder is directed to the main cyclone 42 after being partially cooled by mixing with outside dilution air introduced into the connecting ductwork. Separated ash reports to the ash bin 43 and the cooled and clean gas effluent is directed to the discharge duct 44. Outside air for combustion and cooling/dilution enters through ducts 45. For clarity ancillary equipment such as blowers and motors are not shown.

What is claimed is:

1. A mobile unit for processing refuse as it is collected comprising an outer casing, means for bag ripping followed by means for sorting high density matter from low density matter followed by means for shredding followed by means for pre-heating and classifying the matter into a light fraction and a heavy fraction followed by means for separating the light fraction from the gas stream followed by means for incinerating the light fraction followed by means for cleaning the combustion gases, means for collecting the resource recovery items and ash.

2. A mobile unit according to claim 1 in which the outer casing contains sound absorbing means.

3. A mobile unit according to claim 1 in which the means for sorting consists of a trommel or rotating screen inclined to the horizontal.

4. A mobile unit according to claim 1 in which the means for sorting consists of a magnetic separator.

5. A mobile unit according to claim 1 in which the means for incineration consists of a rotating combustion chamber.

6. A mobile unit according to claim 1 in which the means for gas cleaning consists of cyclone or vortex type particle separators.

7. A mobile unit according to claim 1 in which the means for clasifying the matter into a light fraction and a heavy fraction consists of a revolving tapered drum.

8. A mobile unit according to claim 1 in which the means for classifying the matter into a light fraction and a heavy fraction contains means to pre-heat the matter by utilizing combustion gas products from the incinerating means.

* * * * *